United States Patent [19]

Dondlinger

[11] Patent Number: 4,953,908
[45] Date of Patent: Sep. 4, 1990

[54] LOUVERED HEADACHE RACK

[76] Inventor: Jerry A. Dondlinger, P.O. Box 2891, Amarillo, Tex. 79105-2891

[21] Appl. No.: 398,826

[22] Filed: Aug. 23, 1989

[51] Int. Cl.$^5$ ................................................ B60J 3/00
[52] U.S. Cl. ..................................... 296/97.4; 296/1.1; 280/762
[58] Field of Search ...................... 296/1.1, 95.1, 97.4; 280/748, 770, 762; 49/64

[56] References Cited

U.S. PATENT DOCUMENTS

| | | | |
|---|---|---|---|
| 3,412,506 | 11/1968 | Shiota | 296/97.4 |
| 4,611,824 | 9/1986 | McIntosh | 296/1.1 |
| 4,715,643 | 12/1987 | Butler | 296/152 |

*Primary Examiner*—Robert R. Song
*Attorney, Agent, or Firm*—Wendell Coffee

[57] ABSTRACT

A trapezoidial louver frame is mounted on the forward top edge of the bed of a pickup truck. The frame is behind the rear window of the cab of the pickup. A plurality of rods are journaled to the sides of the frame and extend across the frame. Louver slats are welded to the rods. Two stanchions extend from the top to the bottom of the frame spaced there along. The rods also are telescoped through the stanchions. At all joints the rods are journaled within Neoprene grommets in the sides and stanchions. An operating bar is journaled to fingers extending from each rod. A remote control wire extends from the instrument panel within the cab to the operating bar to open and close the louvers.

18 Claims, 2 Drawing Sheets

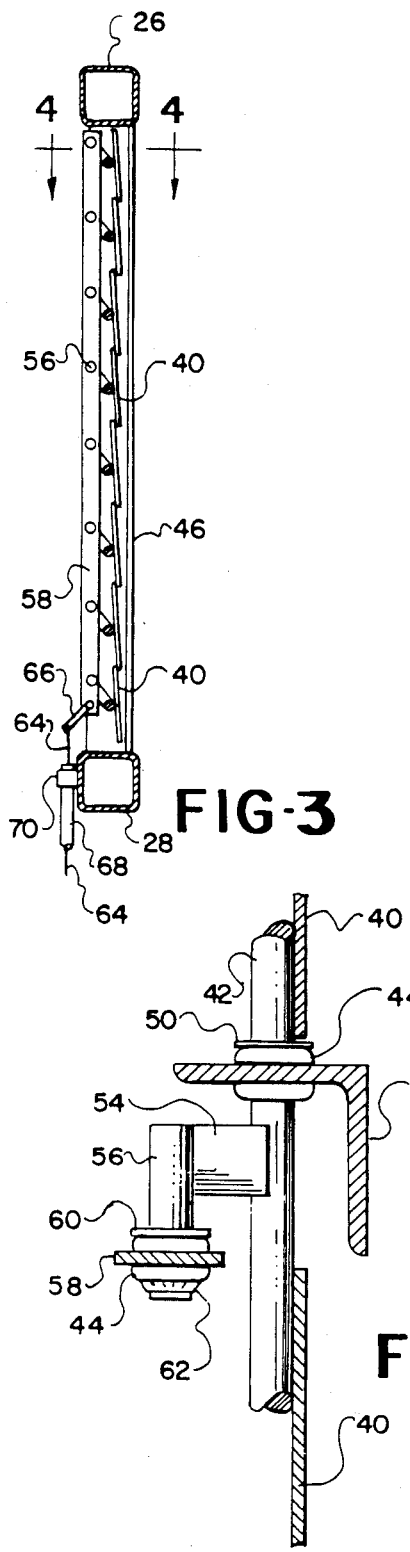
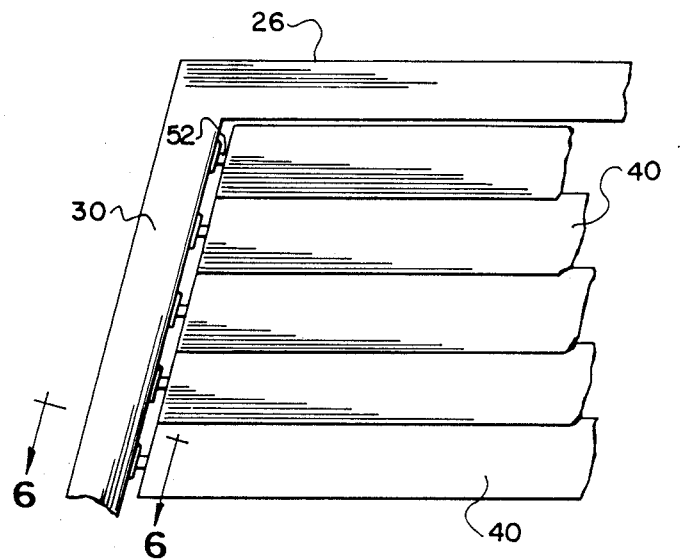
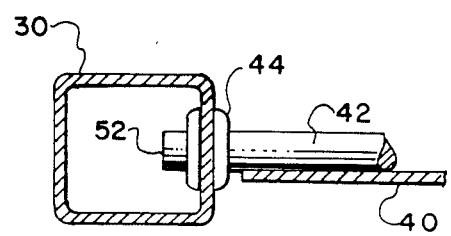

LOUVERED HEADACHE RACK

RIGHTS TO INVENTIONS UNDER FEDERAL RESEARCH

There was neither federally sponsored research nor development concerning this invention.

BACKGROUND OF THE INVENTION

(1) Field of the Invention

This invention relates to the land vehicles and more particularly to a louvered headache rack to be mounted behind the rear window of a pickup truck.

(2) Description of the Related Art

Pickup trucks (or pickups) often have headache racks attached to the front of the bed. These headache racks are usually tubular members which protect the cab from any shifting cargo within the bed. Also in the event of an accident with the pickup rolling over, they prevent the top from being crushed. Elongated cargo such as ladders may be stacked from the back of the bed over the headache rack. In some instances headache racks perform primarily an ornamental function.

In the construction of a truck and including a pickup, there is usually a frame which is supported by four wheels. The frame is flexible. Therefore, if there is more or less load in the bed, the relationship of the bed to the cab will change. Also, as the vehicle travels over uneven road surfaces there will be movement between the bed and the cab. Usually the bed and the cab are separated so that bed is a unit separate from the cab. Applicant is aware that some pickups have a single unit of cab and bed.

In addition, pickups cabs have a rear window. The occupants are normally located adjacent to the rear window. Therefore, in sunny climates there is a problem of heat radiation through the rear window upon the occupants of the cab. For this reason, workers in the prior art have suggested placing louvers over the rear window. An example of such a louver is shown in BUTLER'S U.S. Pat. No. 4,715,643. This patent discloses a louver attached to the cab of the pickup. The louver are rigid and not adjustable.

Before this application was filed, applicant was also aware of LOCKSHIN'S U.S. Pat. 4,232,483 of a louver for a hatch-back type automobile. This patent discloses louvers which are hinged so that the entire unit can be raised. The fixed or rigid louvers are not adjustable but always in one position the same as BUTLER.

Although no patent was found showing such a structure, applicant was aware before his invention, of headache racks commercially on the market which had louvers rigidly fixed in a single position. The headache rack was attached to the bed of a pickup truck. The rigid or fixed louvers were behind the rear window of the cab.

SUMMARY OF THE INVENTION

(1) Progressive Contribution to the Art

This invention provides adjustable louvered headache rack behind the rear window of the cab. The louvers may be adjusted in a horizontal position for maximum rearward vision or they may be entirely closed giving privacy to anyone within the cab of the pickup. They may be adjusted in any position between the horizontal or maximum open position and the fully closed position by a knob mounted upon the instrument panel of the truck.

As indicated before, not only do they prevent radiation upon the back of the occupants of the cab when the sun is in such a direction but also they can be closed when the cab is empty and locked to prevent excessive temperatures accumulating within the cab. In addition when the pickup is operated at night the louvers can be completely or partially closed to prevent the glare of headlights from behind the pickup.

Louver slats are attached to rods which are mounted in the sides of the frame of the headache rack by Neopreme grommets to prevent rattling and also to form a frictional fit so that once the louvers are adjusted to a desired position they will remain in this position until the angle of the louvers is changed by operation of a control in the cab.

Each of the rods carrying louver slats has a rigid finger which is journaled to an operating bar which extends along each of the rods of the louvers. The operating bar is moved vertically by a control wire extending through a sheath and preferably terminating at the instrument panel within the cab.

(2) Objects of this Invention

An object of this invention is to attach a headache rack with adjustable louvers upon a pickup.

Further objects are to achieve the above with devices that are sturdy, compact, durable, lightweight, simple, safe, efficient, versatile, ecologically compatible, energy conserving, and reliable, yet inexpensive and easy to manufacture, install, adjust, operate and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 3 is a sectional view taken on line 3—3 of FIG. 2 showing the louvers in a fully closed position.

FIG. 4 is a sectional view taken on line 4—4 of FIG. 3 showing details of construction.

FIG. 5 is a rear elevational view of the area at the left upper corner of the rack with the louvers fully closed.

FIG. 6 is a sectional view taken on line 6—6 of FIG. 5.

Figure 1:
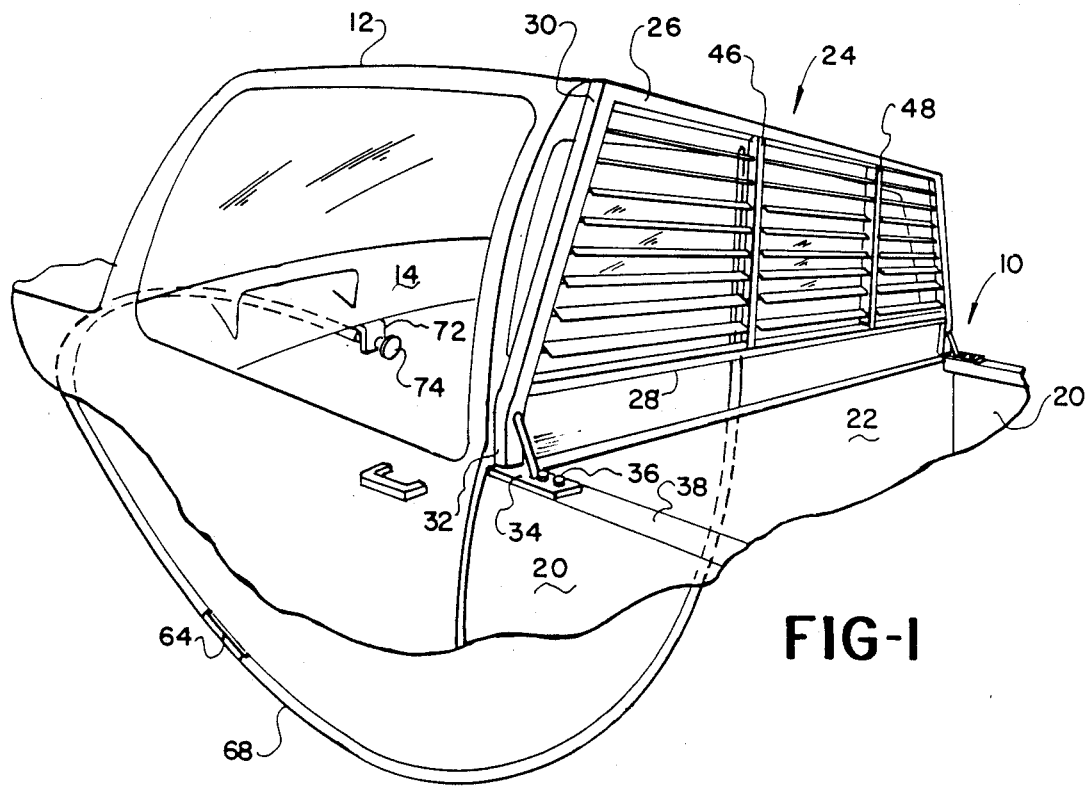
FIG. 1 is a left rear perspective view of a embodiment of this invention with the control wire schematically illustrated and the louvers in an open position.
Figure 2:
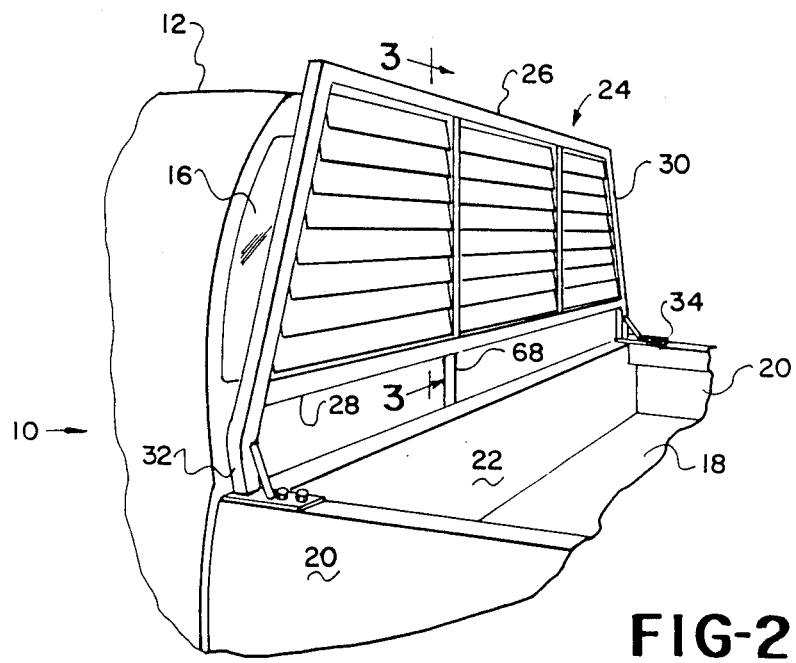
FIG. 2 is a similar view to FIG. 1 showing the louvers in a closed or nearly closed position.

As an aid to correlating the terms of the claims to the exemplary drawing, the following catalog of elements and steps is provided.

| | |
|---|---|
| 10. Pick Up Truck | 44. grommet |
| 12. Cab | 46. Master Stanchion |
| 14. Instrument Panel | 48. Second Stanchion |
| 16. Rear Window | 50. Steel Washer |
| 18. Bed | 52. Pin |
| 20. Side Panels | 54. Finger |
| 22. Front Panel | 56. Crank Pin |
| 24. Headace rack | 58. Operator Bar |
| 26. Top Tube | 60. Washer |
| 28. Bottom Tube | 62. Spring Nut |
| 30. Non-parallel Side Tubes | 64. Control Wire |
| 32. Legs | 66. Clevis |
| 34. Plate | 68. Sheath |
| 36. Bolts | 70. Clamp |
| 38. Forward Upper Edge | 72. Clip |

| | |
|---|---|
| -continued | |
| 40. Louver Slats | 74. Knob |
| 42. Rods | |

DETAILED DESCRIPTION OF THE PREFERRED EMBODIMENT:

Referring to the drawings, there may be seen pickup truck 10. The pickup will have cab 12. The cab will include instrument panel 14 and rear window 16. Bed 18 will include a box having side panels 20 and front panel 22. As discussed above there will normally be relative movement between the bed 18 with the side panels 20 and the cab 12 including the rear window 16.

Those having ordinary skill will understand that the parts described to this point are old and well known.

Headache rack 24 is attached to the bed. The rack will include a frame generally shaped as an isosceles trapezoid. I.e., it will have top edge tube 26 parallel to bottom edge tube 28 and two non-parallel side edge tubes 30. The frame is made of metal The tubes forming the side edges 30 extend below the bottom tube 28 forming legs 32. Plate 34 is attached to the bottom of the legs 32 forming a foot. The foot is attached by bolts 36 to the forward upper edge 38 of the bed 18. As illustrated the forward upper edge of the bed will be the forward top edge 38 of each of the side panels 20. The forward upper edge 38 of the bed is below the rear window 16. The frame having edge 38 of the bed is below the rear window 16. The frame having the tubes 26, 28 and 30 is behind the rear window 16 and would be considered as outlining the rear window. The frame would roughly coincide with the perimeter of the rear window.

It may be seen that the frame also has four corners, namely it has two top corners between the top tube 26 and each of the side tubes 30 and has two bottom corners between the bottom tube 28 and the side tubes 30. Thus the frame is attached to the forward upper edge of the bed 18 at the two bottom corners.

A plurality of louver slats 40 are journaled between the two side tubes 30. The louver slats 40 are parallel to the top edge 26 and bottom edge 28 and therefore are parallel to one another.

Each of the slats is attached by welding to rod 42. Each of the rods 42 is telescoped through a hole in the side tubes 30 An elastometeric grommet 44 is in each of the holes. Therefore the rods 42 and thus the slats 40 are held with a frictional hold. This not only keeps the slats in the position until moved, it also keeps the louvers from rattling.

Master stanchion 46 and second stanchion 48 extend from the top tube 26 to the bottom tube 28. Preferably the stanchions 46 and 48 are in the form of angle iron and are attached to the top and bottom tubes by welding. The stanchions likewise have holes through which the rods 42 are telescoped. Also elastometeric grommets 44 in the holes hold the rods 42 in basic position and furthermore prevent rattling. Although other elastometers are suitable for this purpose I prefer to use Neopreme because of its ability to be painted and to withstand exposure to sun light without rapid deterioration. Steel washer 50 is placed on the rods 42 adjacent to each of the stanchions 46 and 48 preferably on the inboard side. The washers 50 being attached as by welding to the rods keep the rods 42 from moving axially.

The end portion of the rod 42 which extends into the side member 30 is pin 52 on each end of the slat 40.

At the master stanchion 46 each of the rods 42 have finger 54 rigidly attached thereto as by welding. Crank pin 56 is attached to the distal end of each finger 54 as by welding. Each of the crank pins 56 will be parallel to the rods 42.

Operator bar 58 extends vertically near the master stanchion 46. It has a plurality of holes there through. Each of the crank pins 56 journal through one of the holes in the operator bar 58. As before, grommet 44 is within the hole and the pin 56 extends through the grommet.

The operator bar is held in position on the crank pins 56 by washer 60 on one side and on the other side by spring nut 62, as seen in the drawing.

Control wire 64 is connected to the operator bar 58 by clevis 66. The control wire is contained within sheath 68. The sheath 68 is in the form of a helical wire coil as is well known in the automotive arts. Clamp 70 is used to clamp the sheath 68 to the bottom tube 28. Clip 72 attaches the distal end of the sheath 68 to the instrument panel 14 within the cab. The control wire 64 terminates with knob 74 within the cab 12. Pushing or pulling the control knob 74 will move the Control wire 64 to move the operator bar 58 up and down. The movement up and down of the operator bar through the fingers 54 will rotate the rods 42 carring the louver slats 40 thereon. Thus the louvers mounted upon the upper forward edge of the bed 18 are opened or closed from within the cab.

The embodiment shown and described above is only exemplary. I do not claim to have invented all the parts, elements or steps described. Various modifications can be made in the construction, material, arrangement, and operation, and still be within the scOpe of my invention.

The restrictive description and drawing of the specific examples above do not point out what an infringement of this patent would be, but are to enable one skilled in the art to make and use the invention. The limits of the invention and the bounds of the patent protection are measured by and defined in the following claims.

I claim as my invention:
1. On a pickup truck having
   a. a bed behind
   b. a cab,
   c. a rear window in the cab, and
   d. an instrument panel in the cab;
   e. an improved adjustable louvered headache rack comprising:
   f. a frame having four edge members each in the form of a tube, namely:
      i. a top tube,
      ii. a bottom tube, parallel to the top tube, and
      iii. two side tubes,
   g. said frame attached to the pick up truck, so that
   h. the frame is behind the rear window, and
   j. a plurality of louver slats in the frame,
   k. each slat
      i. parallel to the top and bottom tubes, and
      ii. journaled to the side tubes by
      iii. a pin at each end of each slat,
   l. an operating bar extending from about the top tube to about the bottom tube, and
   m. a finger rigidly attached to each of said slats,
   n. each finger journaled to said operating bar.
2. The invention as defined in claim 1 further comprising:
   o. a wire telescoped within a sheath, p. one end of the sheath secured to the bottom tube,
q. said wire connected to said operating bar.

3. The invention as defined in claim 2 and further comprising:
r. the other end of said sheath anchored to said instrument panel, and
s. a knob on the wire at the instrument panel whereby the movement of a knob operates the louver slats through the operator bar.

4. On a pickup truck having
a. a bed behind
b. a cab,
c. a rear window in the cab, and
d. a forward upper edge of the bed below the rear window;
e. an improved adjustable louvered headache rack comprising:
f. a frame having four edge members each in the form of a tube, namely:
 i. a top tube,
 ii. a bottom tube, parallel to the top tube, and
 iii. two side tubes,
g. the frame also having four corners, namely:
 i. two top corners, one each between the top tube and one of the side tubes, and
 ii. two bottom corners, one each between the bottom tube and one of the side tubes,
h. said frame attached to the forward upper edge of the bed at the two bottom corners, so that
j. the frame is behind the rear window,
k. a plurality of louver slats in the frame,
l. each slat
 i. parallel to the top and bottom tubes, and
 ii. journaled to the side tubes by
 iii. a pin at each end of each slat,
m. said bed is a box bed having two side panels, the forward top edge of each side panel being one of said forward upper edge of the bed,
n. each of side tubes extending below the bottom tube to form legs, and
o. a plate attached to the bottom of each leg forming a foot,
p. each of said feet bolted to one of the top edges of said side panels.

5. On a pickup truck having
a. a bed behind
b. a cab,
c. a rear window in the cab, and
d. a forward upper edge of the bed below the rear window;
e. an improved adjustable louvered headache rack comprising:
f. a frame having four edge members each in the form of a tube, namely:
 i. a top tube,
 ii. a bottom tube, parallel to the top tube, and
 iii. two side tubes,
g. the frame also having four corners, namely:
 i. two top corners, one each between the top tube and one of the side tubes, and
 ii. two bottom corners, one each between the bottom tube and one of the side tubes,
h. said frame attached to the forward upper edge of the bed at the two bottom corners, so that
j. the frame is behind the rear window,
k. a plurality of louver slats in the frame,
l. each slat
 i. parallel to the top and bottom tubes, and
 ii. journaled to the side tubes by
 iii. a pin at each end of each slat,
m. rods extending along each of said slats, and
n. said rods extending beyond each end of the slats forming said pins which are journaled within the side tubes.

6. On a pickup truck having
a. a bed behind
b. a cab,
c. a rear window in the cab, and
d. a forward upper edge of the bed below the rear window;
e. an improved adjustable louvered headache rack comprising:
f. a frame having four edge members each in the form of a tube, namely:
 i. a top tube,
 ii. a bottom tube, parallel to the top tube, and
 iii. two side tubes,
g. the frame also having four corners, namely:
 i. two top corners, one each between the top tube and one of the side tubes, and
 ii. two bottom corners, one each between the bottom tube and one of the side tubes,
h. said frame attached to the forward upper edge of the bed at the two bottom corners, so that
j. the frame is behind the rear window,
k. a plurality of louver slats in the frame,
l. each slat
 i. parallel to the top and bottom tubes, and
 ii. journaled to the side tubes by
 iii. a pin at each end of each slat, and
m. each pin having a friction fit where it is journaled to the side tube.

7. On a pickup truck having
a. a bed behind
b. a cab,
c. a rear window in the cab, and
d. a forward upper edge of the bed below the rear window;
e. an improved adjustable louvered headache rack comprising:
f. a frame having four edge members each in the form of a tube, namely:
 i. a top tube,
 ii. a bottom tube, parallel to the top tube, and
 iii. two side tubes,
g. the frame also having four corners, namely:
 i. two top corners, one each between the top tube and one of the side tubes, and
 ii. two bottom corners, one each between the bottom tube and one of the side tubes,
h. said frame attached to the forward upper edge of the bed at the two bottom corners, so that
j. the frame is behind the rear window,
k. a plurality of louver slats in the frame,
l. each slat
 i. parallel to the top and bottom tubes, and
 ii. journaled to the side tubes by
 iii. a pin at each end of each slat,
m. an operating bar extending from about the top tube to about the bottom tube, and
n. a finger rigidly attached to each of said slats,
o. each finger journaled to said operating bar.

8. The invention as defined in claim 5 further comprising:

o. at least one stanchion attached to the top tube and to the bottom tube, said rods extending through holes in the stanchion.

9. The invention as defined in claim 6 further comprising:

n. a plurality of elastometeric grommets fixed into the side tube and one of said grommets journaled over each one of said pins forming said friction fit.

10. The invention as defined in claim 9 further comprising:

o. said elastometeric grommet being made of Neopreme.

11. The invention as defined in claim 7 further comprising:

p. a wire telescoped within a sheath,
q. one end of the sheath secured to the bottom tube,
r. said wire connected to said operating bar.

12. The invention as defined in claim 11 wherein s. said cab has an instrument panel therein, and further comprising:
t. the other end of said sheath anchored to said instrument panel, and
u. a knob on the wire at the instrument panel whereby the movement of a knob operates the louver slats through the operator bar.

13. The invention as defined in claim 11 further comprising:

s. rods extending along each of said slats,
t. said rods extending beyond each end of the slats forming said pins which are journaled within the side tubes.

14. The invention as defined in claim 13 further comprising:

u. at least one stanchion attached to the top tube and to the bottom tube, said rods extending through holes in the stanchion.

15. The invention as defined in claim 11 further comprising:

s. each pin having a friction fit where it is journaled to the side tube.

16. The invention as defined in claim 15 further comprising:

t. a plurality of Neopreme grommets fixed into the side tube and one of said grommets journaled over each one of said pins forming said friction fit.

17. The invention as defined in claim 11 further comprising:

s. said frame being in the shape of an isosceles trapezoid.

18. The invention as defined in claim 11 wherein:

s. said bed is a box bed having two side panels, the forward top edge of each side panel being one of said forward upper edge of the bed,
t. each of side tubes extending below the bottom tube to form legs,
u. a plate attached to the bottom of each leg forming a foot,
v. each of said feet bolted to one of the top edges of said side panels.

* * * * *